United States Patent
Schulz et al.

(10) Patent No.: US 9,894,495 B2
(45) Date of Patent: Feb. 13, 2018

(54) BEACON CONTENT PROPAGATION

(71) Applicant: PayPal, Inc., San Jose, CA (US)

(72) Inventors: Egan Schulz, San Jose, CA (US); Michelle Serrano, San Jose, CA (US); Libo Su, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 14/937,822

(22) Filed: Nov. 10, 2015

(65) Prior Publication Data

US 2016/0066162 A1 Mar. 3, 2016

Related U.S. Application Data

(63) Continuation of application No. 14/137,642, filed on Dec. 20, 2013, now Pat. No. 9,215,570.

(60) Provisional application No. 61/901,338, filed on Nov. 7, 2013.

(51) Int. Cl.
| | |
|---|---|
| *H04B 7/00* | (2006.01) |
| *H04W 24/00* | (2009.01) |
| *H04W 4/06* | (2009.01) |
| *H04W 4/00* | (2009.01) |
| *H04W 4/02* | (2009.01) |
| *G01S 1/68* | (2006.01) |
| *G06Q 30/02* | (2012.01) |

(52) U.S. Cl.
CPC ............ *H04W 4/06* (2013.01); *G01S 1/68* (2013.01); *G06Q 30/0261* (2013.01); *H04W 4/008* (2013.01); *H04W 4/023* (2013.01)

(58) Field of Classification Search
CPC ......... H04W 4/02; H04W 4/12; H04W 12/08; H04W 40/244; H04W 76/021; H04W 88/08; G06Q 20/02; G06Q 20/08; G06Q 30/02; G06Q 30/0259; G06Q 30/0261; G06Q 30/0267
USPC ....... 455/414.1–414.2, 440, 456.1–457, 461, 455/41.2–41.3
See application file for complete search history.

(56) References Cited

U.S. PATENT DOCUMENTS

| | | | |
|---|---|---|---|
| 6,816,730 B2 | 11/2004 | Davies et al. | |
| 6,831,896 B1 | 12/2004 | Lempie et al. | |
| 8,243,661 B2 | 8/2012 | Agrawal et al. | |
| 2002/0156861 A1 | 10/2002 | Pierce | |
| 2002/0194141 A1* | 12/2002 | Langensteiner | G06Q 20/02 705/67 |
| 2003/0220114 A1 | 11/2003 | Langensteiner et al. | |
| 2004/0162059 A1 | 8/2004 | Hiltunen et al. | |
| 2005/0043043 A1* | 2/2005 | Winn | H04L 29/06 455/456.5 |

(Continued)

OTHER PUBLICATIONS

International Search Report and Written Opinion, PCT/US14/53298, dated Dec. 2, 2014, 8 pages.

*Primary Examiner* — Simon Nguyen

(74) *Attorney, Agent, or Firm* — Haynes and Boone, LLP

(57) ABSTRACT

Systems and methods for transmitting beacon messages are described. A beacon message is transmitted from a first beacon device and broadcast to an area within a transmission range of the first beacon device. A mobile device receives and stores the message. When the mobile device is out of the range of the first beacon device and within the range of a second beacon device, the message is transmitted to the second beacon device and broadcast by the second beacon device.

20 Claims, 3 Drawing Sheets

(56) References Cited

U.S. PATENT DOCUMENTS

| | | | |
|---|---|---|---|
| 2005/0094571 A1* | 5/2005 | Lempio | H04W 48/12 370/252 |
| 2006/0009191 A1* | 1/2006 | Malone, III | H04W 4/22 455/404.1 |
| 2006/0087474 A1* | 4/2006 | Do | G01S 1/024 342/386 |
| 2009/0131079 A1 | 5/2009 | Sekhar | |
| 2010/0061294 A1* | 3/2010 | Proctor, Jr. | G06Q 30/0623 370/328 |
| 2010/0195569 A1 | 8/2010 | Matsushita et al. | |
| 2010/0202339 A1 | 8/2010 | Chieng et al. | |
| 2010/0287052 A1 | 11/2010 | Minter et al. | |
| 2011/0035594 A1* | 2/2011 | Fox | G06Q 30/02 713/170 |
| 2011/0201275 A1 | 8/2011 | Jabara et al. | |
| 2012/0313761 A1* | 12/2012 | Rolin | G06K 19/0723 340/10.5 |
| 2013/0065584 A1* | 3/2013 | Lyon | H04W 28/06 455/434 |
| 2013/0099920 A1 | 4/2013 | Song et al. | |
| 2013/0133087 A1 | 5/2013 | Proctor, Jr. et al. | |
| 2014/0036683 A1 | 2/2014 | Krishnamurthy et al. | |
| 2014/0135042 A1* | 5/2014 | Buchheim | G01S 1/68 455/456.6 |
| 2014/0171062 A1* | 6/2014 | Fallgren | H04W 40/22 455/422.1 |
| 2014/0279014 A1* | 9/2014 | Roka | G06Q 30/0261 705/14.58 |
| 2014/0316685 A1* | 10/2014 | Povolny | G01S 5/0027 701/117 |
| 2014/0321317 A1 | 10/2014 | Kasslin et al. | |
| 2014/0364148 A1* | 12/2014 | Block | H04W 4/02 455/456.3 |
| 2014/0365334 A1* | 12/2014 | Hurewitz | G06Q 30/0613 705/26.41 |
| 2015/0066802 A1* | 3/2015 | Goulart | G06Q 30/0281 705/346 |
| 2015/0073980 A1* | 3/2015 | Griffin | H04W 4/008 705/39 |
| 2015/0079942 A1* | 3/2015 | Kostka | G06Q 30/0633 455/411 |
| 2015/0094080 A1* | 4/2015 | Bleecher Snyder | H04W 4/02 455/456.1 |
| 2015/0120504 A1* | 4/2015 | Todasco | G06Q 20/322 705/26.61 |
| 2015/0350839 A1* | 12/2015 | Syrjarinne | G01C 21/206 455/404.2 |
| 2016/0078484 A1* | 3/2016 | Emigh | G06Q 30/0211 705/14.58 |
| 2016/0171486 A1* | 6/2016 | Wagner | G06Q 20/12 705/39 |

\* cited by examiner

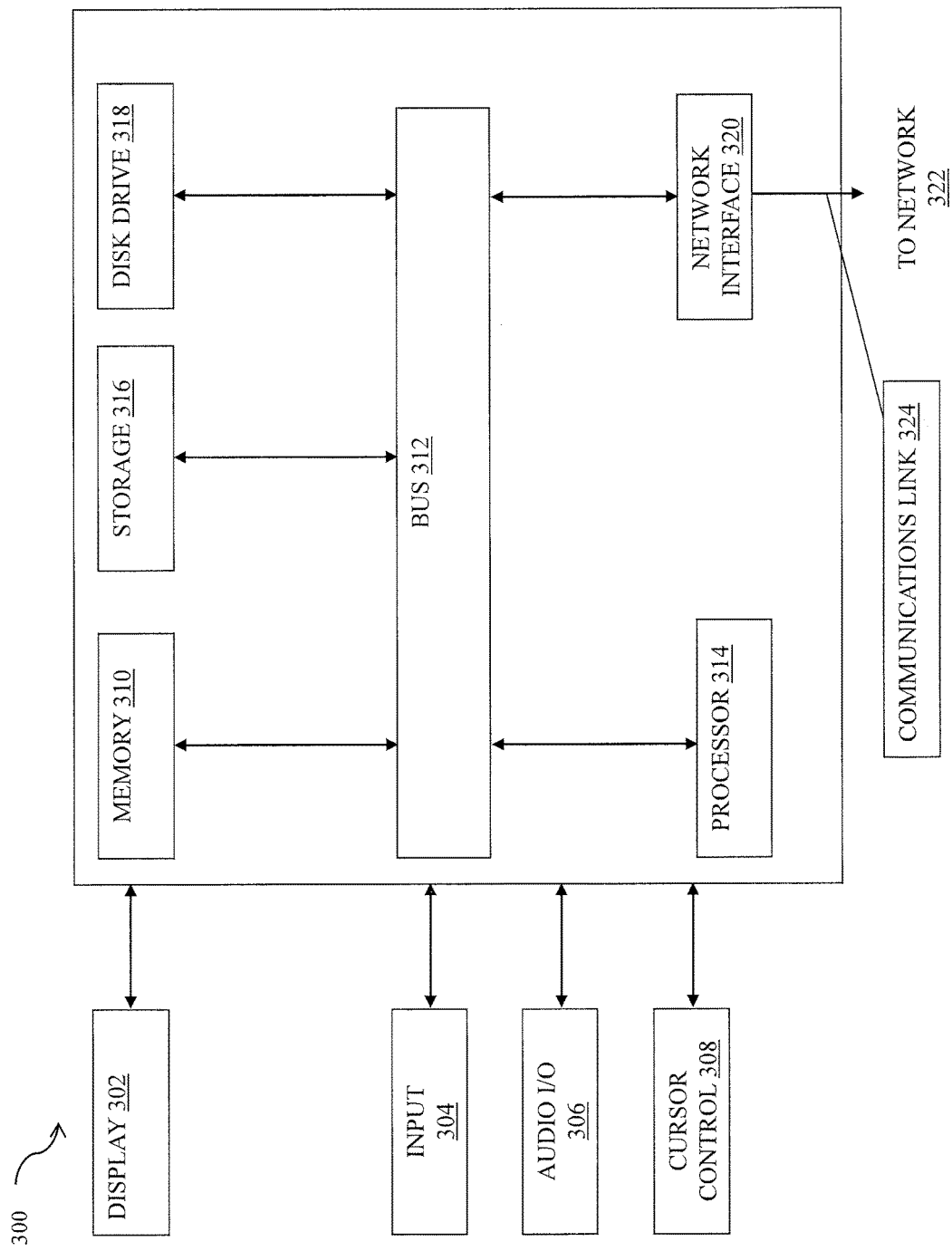

BEACON CONTENT PROPAGATION

CROSS-REFERENCE TO RELATED APPLICATIONS

This application is a continuation of Ser. No. 14/137,642, filed Dec. 20, 2013, which is incorporated herein by reference in its entirety, which claims priority to the filing date of U.S. Provisional Patent Application No. 61/901,338, filed Nov. 7, 2013, which is incorporated by reference in its entirety.

BACKGROUND

Field of the Invention

The present invention generally relates to the transmittal of beacon messages from one location to another location.

Related Art

Even when not being used by a user, mobile computing devices typically communicate with a cellular network at intervals to send and receive data for various purposes, such as updating the time, determining the location of the mobile computing device, or checking signal strength. These communications are often instigated by the mobile computing devices by sending a message to the network and receiving some form of response. These actions can use a significant amount of energy and reduce the battery life of the mobile computing device.

For communicating with other mobile devices over relatively short distances, Bluetooth™ wireless technology has become increasingly popular, allowing a mobile computing device to communicate wirelessly with another nearby device without having to route the communication through a network of remote devices, such as satellites and cell towers. Once the nearby device communicates a message to the mobile computing device, the message typically does not move any further. Thus, a need exists for systems and methods that allow the message to be spread over a larger area.

BRIEF DESCRIPTION OF THE FIGURES

FIG. 3 is a block diagram of a system for implementing a device according to an embodiment of the present disclosure.

Figure 1:
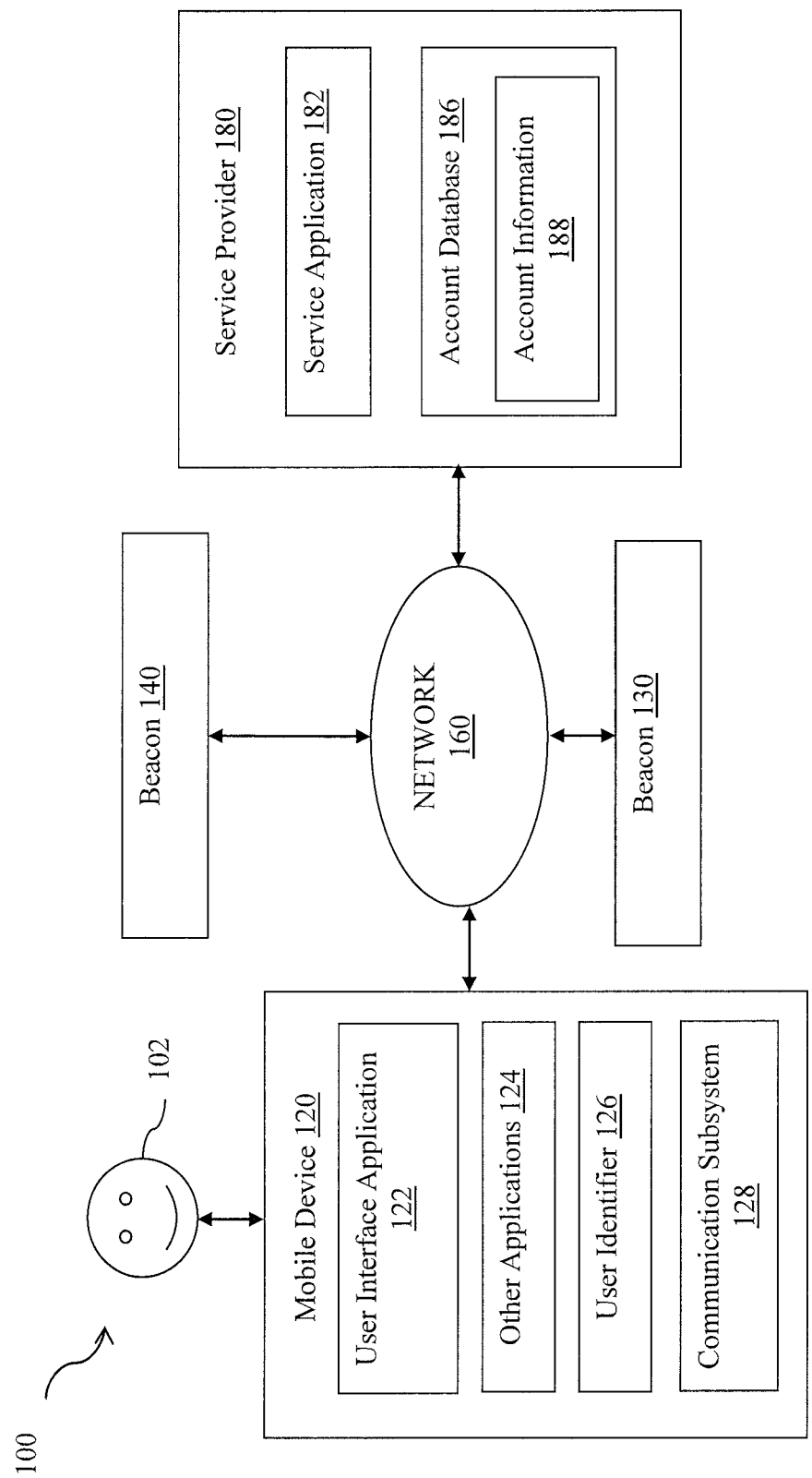
FIG. 1 is a block diagram illustrating a system for transmitting beacon messages according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes the dissemination of beacon messages from one transmission range to a second, different transmission range. A beacon message is transmitted from a first stationary beacon generation device and broadcast to an area within a transmission range of the first beacon generation device. Mobile devices, such as mobile phones, can receive and store the message. When the mobile device is out of range of the first beacon generation device and within the range of a second beacon generation device, the message can be transmitted to the second beacon generation device and broadcast by the second beacon generation device. All of these actions can be performed with minimal energy use by the beacon generation devices and the mobile device.

As defined herein, a beacon is a short range communication device having a known or fixed location that provides a signal that can be detected by mobile devices within a certain proximity of the beacon. An example of a beacon is a radio frequency (RF) beacon (e.g., Bluetooth™ low energy (BLE) beacon), infrared beacon or a radio frequency identifier (RFID) tag. For example, a BLE beacon can broadcast an RF signal that includes its position coordinates (e.g., latitude, longitude), which can be detected by a mobile device. In some implementations, the beacon can also advertise location based services provided by a beacon network. A beacon network encompasses a plurality of beacons in a geographic region.

When a mobile device first makes contact with a beacon in the beacon network, the beacon can transmit to the mobile device a list of unique identifiers of other beacons in the network and other information about the beacon network. Beacon networks can be located in any geographic region including businesses (e.g., shopping malls, retail stores, restaurants, etc.), landmarks (e.g., museums, airports, parks, entertainment venues, etc.), homes and any other environments where location based services are desired. Even more specifically beacons can be placed in store shelves and end caps to give precise location information about products.

FIG. 1 shows one embodiment of a block diagram of a network-based system 100 adapted to transmit a beacon message using a mobile device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a mobile device 120 (e.g., a smartphone), one or more beacons 130, 140 (e.g., a RF beacon or BLE beacon), and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the mobile device 120, one or more beacons 130, 140 and service provider server or device 180 may be associated with a particular link (e.g., a link, such as a URL (Uniform Resource Locator) to an IP (Internet Protocol) address).

The mobile device 120 is configured to perform one or more tasks when mobile device 120 is located in proximity to the beacon 130 or 140. The task to be performed can include, for example, launching an application program, setting certain files to non-accessible mode, initiating a phone call, sounding an alarm, storing a message, etc. In one embodiment, the mobile device 120 stores a message transmitted by the beacon 130 or 140.

The mobile device 120, in various embodiments, may be implemented using any appropriate combination of hardware and/or software configured for wired and/or wireless communication over the network 160. The mobile device 120, in one embodiment, may be utilized by the user 102 to interact with the service provider server 180 over the network 160. For example, the user 102 may conduct financial transactions (e.g., account transfers, bill payment, etc.) with the service provider server 180 via the mobile device 120. In various implementations, the mobile device 120 may include a wireless telephone (e.g., cellular or mobile phone), a tablet, a personal digital assistant (PDA), a personal computer, a notebook computer, and/or various other generally known types of wired and/or wireless computing devices.

The mobile device 120, in one embodiment, includes a user interface application 122, which may be utilized by the user 102 to conduct transactions (e.g., shopping, purchasing, bidding, etc.) with the service provider server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

The mobile device 120, in various embodiments, may include other applications 124 as may be desired in one or more embodiments of the present disclosure to provide additional features available to user 102. In one example, such other applications 124 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

The mobile device 120, in one embodiment, may include at least one user identifier 126, which may be implemented, for example, as operating system registry entries, cookies associated with the user interface application 122, identifiers associated with hardware of the mobile device 120, or various other appropriate identifiers. The user identifier 126 may include one or more attributes related to the user 102, such as personal information related to the user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

In some embodiments, the mobile device 120 includes a communication subsystem 128, which can include RF receivers and transmitters and/or optical (e.g., infrared) receivers and transmitters. The specific design and implementation of the communication subsystem 128 can depend on the communication network over which the mobile device 120 is intended to operate. For example, the mobile device 120 can include communication subsystems designed to operate over a Global System for Mobile Communication (GSM) network, a General Packet Radio Service (GPRS) network, an Enhanced Data Rates for Global Evolution (EDGE) network, a Wi-Fi or WiMax network, and a Bluetooth™ network.

Beacons 130, 140, may be set up by merchants or individuals offering various items, such as products and/or services for sale. Beacons 130, 140 are typically maintained by one or more service providers. Beacons 130, 140 together form a beacon network. When the user 102 comes in range of beacon 130 or 140, a mobile application run by the service provider can wake up and connect to the beacon 130 or 140. The mobile device 120 can then receive and store messages from beacon 130 or 140. In some implementations, beacons 130 and 140 are BLE beacons.

Beacons 130, 140 can output a wireless signal that can be detected by mobile device 120 when the mobile device 120 is within a certain proximity of the beacon 130 or 140. Beacons 130, 140 may be a device that periodically or continuously transmits a signal, such as a short-distance wireless (e.g., BLE), medium distance wireless (e.g., Wi-Fi), and/or other electro, magnetic, and/or electro-magnetic transmissions. The mobile device 120 is configured to detect the transmitted signals from beacons 130, 140, such that when the mobile device 120 is located within the transmission range, the signal may be detected. In an embodiment, the transmission range is about 2 inches to about 160 feet. The range can be controlled by adjusting beacon power.

The service provider server 180, in one embodiment, may be maintained by a transaction processing entity, which may provide processing for financial transactions and/or information transactions between the user 102 and the beacons 130, 140. As such, the service provider server 180 includes a service application 182, which may be adapted to interact with the mobile device 120 and/or the beacons 130, 140 over the network 160. In one example, the service provider server 180 may be provided by PayPal®, Inc., eBay® of San Jose, California, USA, and/or one or more financial institutions or a respective intermediary that may provide multiple point of sale devices at various locations to facilitate transaction routings between merchants and, for example, financial institutions.

The service provider server 180, in one embodiment, may be configured to maintain one or more user accounts and merchant accounts in an account database 186 each of which may include account information 188 associated with one or more individual users (e.g., user 102) and merchants For example, account information 188 may include private financial information of user 102, such as one or more account numbers, passwords, credit card information, banking information, or other types of financial information, which may be used to facilitate financial transactions between user 102 and a merchant. In various aspects, the methods and systems described herein may be modified to accommodate users and/or merchants that may or may not be associated with at least one existing user account and/or merchant account, respectively.

In one implementation, the user 102 may have identity attributes stored with the service provider server 180, and user 102 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

Figure 2:
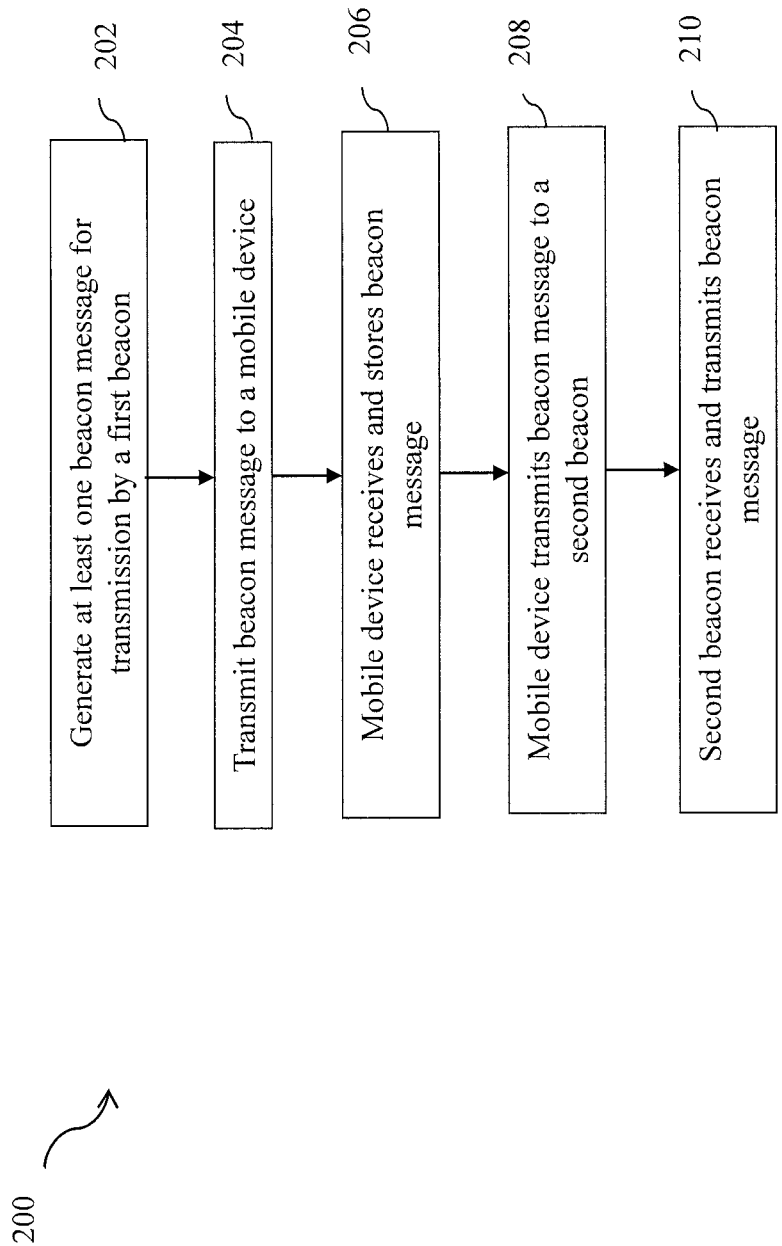
FIG. 2 is a flowchart showing a method for transmitting beacon messages according to an embodiment of the present disclosure.

Referring now to FIG. 2, a flowchart 200 of a method for transmitting beacon messages is illustrated according to an embodiment of the present disclosure. In an embodiment, at step 202, at least one beacon message is generated with a beacon message generation device (e.g., beacon 130). The beacon message may include an advertisement, coupon, promotion, or a combination thereof. For example, the beacon message can contain a URL or other address information that receiving mobile device 120 can use to look up and retrieve information (e.g., location-based information). In an embodiment, the beacon message can include URL information indicating a website from which store coupons can be retrieved. For instance, a grocery store can have a beacon generation device located in or near the store that transmits these "store coupon" type beacon messages. Any mobile computing device near the store can receive the beacon messages and retrieve, or download, up-to-date coupons from the indicated website for use in the store. In another example, a local merchant or seller may provide items for purchase, where details of the seller (e.g., location, type of goods) and/or offered items (e.g., price, description), are included in a beacon message transmitted to devices within communicating distance with the beacon.

At step 204, the generated beacon message is transmitted by the beacon 130 within a transmission range of the beacon 130 for reception by the mobile device 120 located in the transmission area. Beacon messages can be transmitted from a beacon message generation device to one or more mobile devices using a BLE wireless communication protocol. BLE is an exemplary wireless communication protocol that can be used to transmit beacon messages as described herein with low energy cost. The beacon messages are not limited to use with BLE, but can be used with other low energy or non-low energy wireless communication protocols, such as Wi-Fi.

At step 206, the at least one beacon message is received and stored by the mobile device 120. In some examples, the mobile device 120 can receive a beacon message in sleep mode and process the beacon message without awaking from sleep mode to conserve energy. In some embodiments, the mobile device 120 can display a message to the user 102 in response to the beacon message. In other examples, the beacon message contains a URL or other address from which the mobile device 120 can retrieve additional information. User 102 may be provided with relevant information (e.g., advertisements) on the mobile device 120 while in a certain location. In one embodiment, if user 102 is at a museum or large parking garage, beacon 130 can provide mobile device 120 with locations for other beacons (e.g., beacon 140) in the beacon network. These beacon locations can be shown on a map displayed on the mobile device 120. Mobile device 120 can store the received data on a storage device, and the stored data can be updated periodically.

User 102 (and mobile device 120) travel to a location outside of the transmission range of beacon 130, and come within a range of a second, different beacon (e.g., beacon 140). At step 208, the mobile device 120 transmits the beacon message to beacon 140. The information in the beacon message and the range of the beacon message can be set by the originator of the beacon message (e.g., a merchant). For example, a merchant may only want the beacon message to be communicated 50 miles outside of beacon 130's transmission range, or a merchant may only want coupons communicated in the beacon message.

At step 210, beacon 140 receives the beacon message and transmits the beacon message in its transmission range, which may be different from beacon 130's transmission range. In this way, the beacon message can be propagated and spread beyond the transmission range of beacon 130 to reach more users. Note that the transmission ranges may be the same, but because beacon 140 is in a different location than beacon 130, beacon messages transmitted from beacon 140 can reach users outside the range of beacon 130.

A user can knowingly or unknowingly carry the beacon message to other beacons, thereby increasing the message's beacon range. This allows beacon stores, kiosks, messages, etc. to have a potentially wider reach if the beacon originator so desires.

Note that while only beacons 130 and 140 are shown and described, embodiments described herein can be extended to any number of beacons such that a message generated from one beacon can be propagated around the world, using numerous beacons and one or more user mobile devices, even though beacon transmission distances are greatly limited.

EXAMPLE

A particular example will now be described. A person is having a garage sale in San Jose and turns on their beacon. The beacon generates a message that says "Garage Sale at 1234 Main Street. We have vintage vinyl and comic books." A user visiting or nearby the garage sale receives the message from the beacon on the user's mobile device when the device is within a transmission range of the beacon. Other messages may include description and prices of specific items. When the user leaves the garage sale, is out of the transmission range of the beacon, and is in the transmission range of a second beacon, the mobile device transmits the message(s) to the second beacon. The second beacon can then transmit the message to other users not in proximity of the first beacon. As a result, a potential consumer that may not have known about a specific item because the consumer was not able to receive information directly from the garage sale beacon is now aware of the item and can proceed with getting more information about the item and/or purchasing the item. Thus, local merchants are able to reach more potential buyers, and potential buyers are able to receive information about more items offered by sellers.

FIG. 3 is a block diagram of a computer system 300 suitable for implementing one or more embodiments of the present disclosure, including the mobile device 120, beacons 130, 140, and service provider server or device 180. In various implementations, the mobile device 120 and beacons 130, 140 may comprise a mobile cellular phone, personal computer (PC), laptop, PDA, etc. adapted for wireless communication, and the service provider server 180 may comprise a network computing device, such as a server. Thus, it should be appreciated that the devices 120, 130, 140, and 180 may be implemented as computer system 300 in a manner as follows.

Computer system 300 includes a bus 312 or other communication mechanism for communicating information data, signals, and information between various components of computer system 300. Components include an input/output (I/O) component 304 that processes a user (i.e., sender, recipient, service provider) action, such as selecting keys from a keypad/keyboard, selecting one or more buttons or links, etc., and sends a corresponding signal to bus 312. I/O component 304 may also include an output component, such as a display 302 and a cursor control 308 (such as a keyboard, keypad, mouse, etc.). An optional audio input/output component 306 may also be included to allow a user to use voice for inputting information by converting audio signals. Audio I/O component 306 may allow the user to hear audio. A transceiver or network interface 320 transmits and receives signals between computer system 300 and other devices, such as another user device, a merchant server, or a service provider server via network 322. In one embodiment, the transmission is wireless, although other transmission mediums and methods may also be suitable. A processor 314, which can be a micro-controller, digital signal processor (DSP), or other processing component, processes these various signals, such as for display on computer system 300 or transmission to other devices via a communication link 324. Processor 314 may also control transmission of information, such as cookies or IP addresses, to other devices.

Components of computer system 300 also include a system memory component 310 (e.g., RAM), a static storage component 316 (e.g., ROM), and/or a disk drive 318. Computer system 300 performs specific operations by processor 314 and other components by executing one or more sequences of instructions contained in system memory component 310. Logic may be encoded in a computer readable medium, which may refer to any medium that participates in providing instructions to processor 314 for execution. Such a medium may take many forms, including but not limited to, non-volatile media, volatile media, and transmission media. In various implementations, non-volatile media includes optical or magnetic disks, volatile media includes dynamic memory, such as system memory component 310, and transmission media includes coaxial cables, copper wire, and fiber optics, including wires that comprise bus 312. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 324 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A mobile device comprising:
   a non-transitory memory; and
   one or more hardware processors coupled to the non-transitory memory and configured to read instructions from the non-transitory memory to cause the mobile device to perform operations comprising:
      receiving a beacon message from a first stationary beacon at a first location in a store, the first stationary beacon having a first transmission range;
      determining that the mobile device is outside the first transmission range of the first stationary beacon and-within a second transmission range of a second stationary beacon at a second location in the store, the second stationary beacon being outside the first transmission range of the first stationary beacon; and
      in response to the determining, forwarding the beacon message received from first stationary beacon to the second stationary beacon.

2. The mobile device of claim 1, wherein the beacon message comprises a message selected from a group consisting of an advertisement, coupon, and a promotion.

3. The mobile device of claim 1, wherein the beacon message comprises a link to a website.

4. The mobile device of claim 3, wherein the operations further comprise:
receiving a selection of the link by a user of the mobile device; and
displaying the website to the user.

5. The mobile device of claim 1, wherein the beacon message is received while the mobile device is in sleep mode.

6. The mobile device of claim 1, wherein the operations further comprise updating the beacon message.

7. The mobile device of claim 1, wherein the forwarding the beacon message to the second stationary beacon causes the second stationary beacon to broadcast the beacon message within the second transmission range.

8. A method comprising:
receiving, by a mobile device, a beacon message from a first stationary beacon at a first location, the first stationary beacon having a first transmission range;
determining, by the mobile device, that the mobile device is outside the first transmission range of the first stationary beacon and within a second transmission range of a second stationary beacon at a second location, the second stationary beacon being outside the first transmission range of the first stationary beacon; and
in response to the determining, forwarding, by the mobile device, the beacon message received from first stationary beacon to the second stationary beacon.

9. The method of claim 8, wherein the beacon message comprises a message selected from a group consisting of an advertisement, coupon, and a promotion.

10. The method of claim 8, wherein the beacon message comprises a link to a website.

11. The method of claim 10, further comprising receiving, by the mobile device, a selection of the link and displaying, by the mobile device, the website to a user.

12. The method of claim 8, wherein the first stationary beacon, the second stationary beacon, or both, comprise a Bluetooth low energy beacon.

13. The method of claim 8, wherein the beacon message is updated.

14. A non-transitory machine-readable medium having stored thereon machine-readable instructions executable to cause a mobile device to perform operations comprising:
receiving a beacon message from a first stationary beacon at a first location in a store, the first stationary beacon having a first transmission range;
determining that the mobile device is outside the first transmission range of the first stationary beacon and within a second transmission range of a second stationary beacon at a second location in the store, the second stationary beacon being outside the first transmission range of the first stationary beacon; and
in response to the determining, forwarding the beacon message received from first stationary beacon to the second stationary beacon.

15. The non-transitory machine-readable medium of claim 14, wherein the beacon message comprises a message selected from a group consisting of an advertisement, coupon, and a promotion.

16. The non-transitory machine-readable medium of claim 14, wherein the beacon message comprises a link to a website.

17. The non-transitory machine-readable medium of claim 14, wherein the first stationary beacon, the second stationary beacon, or both comprise a Bluetooth low energy beacon.

18. The non-transitory machine-readable medium of claim 14, wherein the first transmission range of the first stationary beacon is about 2 inches to about 160 feet.

19. The non-transitory machine-readable medium of claim 14, wherein information in the beacon message and range of the beacon message are set by a merchant.

20. The non-transitory machine-readable medium of claim 14, wherein the forwarding the beacon message to the second stationary beacon causes the second stationary beacon to transmit the beacon message to a second device that is within the second transmission range.

* * * * *